United States Patent [19]

Hooper

[11] Patent Number: 5,055,193

[45] Date of Patent: Oct. 8, 1991

[54] BIODEGRADATION OF HALOGENATED HYDROCARBONS UTILIZING AMMONIA-OXIDIZING BACTERIUM

[75] Inventor: Alan Hooper, St. Paul, Minn.

[73] Assignee: Regents of the University of Minnesota, Minneapolis, Minn.

[21] Appl. No.: 321,498

[22] Filed: Mar. 9, 1989

[51] Int. Cl.$^5$ ............................................. C02F 3/00
[52] U.S. Cl. .................................. 210/601; 435/262; 435/264
[58] Field of Search ................. 435/262, 264; 210/601

[56] References Cited

FOREIGN PATENT DOCUMENTS 0300593 1/1990 European Pat. Off. .
0289350 11/1990 European Pat. Off. .

OTHER PUBLICATIONS

Little et al., *Appl. Envt. Microbiol.* 54:951–956 (1989), "Trichloroethylene Biodegradation by a Methane Oxidiziny Bacterium."
Wackett and Gibson, *App. Envt. Microbiol.* 54: 1703–1708 (1988), "Degradation of Trichloroethylene by Toluene Dioxygenase in Whole-Cell Studies with Pseudomonas Putida Fl."
Hyman et al., *Appl. Envt. Microbiol.* 54: 3187–3190 (1988), "Interaction of Ammonia Monooxygenase from Nitrosomonas Europaea with Alkanes, Alkenes and Alkynes".
Wood, *In Nitrification*, p. 39 (J. I. Prosser Ed. 1986).
Hooper and Nason, *J. Biol. Chem.*, 240: 4044–4057 (1965), "Characterization of Hydroxylamine–Cytochrome C Reductase from the Chemo Autotrophs Nitrosomonas Europaea and Nitrosomonas Oceanus".
Hooper, *Autotrophic Bacteria*, Schlagel and Bowein, eds. (1989) at pp. 239–265.
Nelson et al., *Appl. Envt. Microbiol.* 53: 949–954 (1987), "Biodegradation of Trichloroethylene and Involvement of an Aromatic Biodegrative Pathway".
G. W. F. Wasser-Abwasser, vol. 129, No. 1, 1988, A. M. Cook, et al., "Mikrobieller Abbau von Halogenierten Aliphatischen Verbindungen", pp. 61–69.
Hyman et al—Chem. Abst., vol. 103 (1985), p. 157,041g.

*Primary Examiner*—Sam Rosen
*Attorney, Agent, or Firm*—Merchant, Gould, Smith, Edell, Welter & Schmidt

[57] ABSTRACT

A method is disclosed for degradation of a halogenated hydrocarbon compound such as trichloroethylene (TCE) which utilizes an ammonia-oxidizing bacterium of the genus Nitrosomonas, as well as other species of ammonia-oxidizing bacteria.

23 Claims, 1 Drawing Sheet

BIODEGRADATION OF HALOGENATED HYDROCARBONS UTILIZING AMMONIA-OXIDIZING BACTERIUM

This invention was made with Government support under USDA contract number 88-37120-3957. Government has certain rights in the invention.

FIELD OF THE INVENTION

This invention relates to methods of biologically degrading halogenated hydrocarbon compounds including trichloroethylene (TCE), wherein said methods utilize an ammonia-oxidizing bacterium.

BACKGROUND OF THE INVENTION

This invention relates to methods of biologically degrading halogenated hydrocarbons including trichlorethylene (TCE).

Halogenated hydrocarbon compounds are high-volume products of the chemical process industry; for example, more than 6 million metric tons of trichloroethylene (TCE), tetrachloroethylene (PCE), trichloromethane, carbon tetrachloride (CT), and chloroform (CF) are produced each year. Those halogenated hydrocarbon compounds most frequently found in groundwater are low molecular weight aliphatic halogenated hydrocarbons: TCE, dichloroethane (DCA), trichloromethane, and PCE. Many of these aliphatic halogeated hydrocarbon compounds, including TCE, have been listed as priority pollutants by the U.S. Environmental Protection Agency, and are known or suspected carcinogens and mutagens. Haloforms (halogenated derivatives of methane) are also frequently detected in groundwaters and drinking waters. Some haloforms are produced during chlorination of water supplies, but inadequate disposal techniques or accidental spillage may also be responsible for the release of these haloforms.

Several of the halogenated hydrocarbon compounds mentioned above are resistant to biodegradation in aerobic subsurface environments, or their biological transformations are incomplete under anaerobic conditions. For example, under anaerobic conditions, TCE and PCE are known to undergo partial bioconversion to vinyl chloride, a compound which is as much or more of a problem as the original contaminants. Wilson and Wilson, *Appl. Env. Microbiol.*, 49:242-243 (1985).

Current technology for reclaiming groundwater polluted with these halogenated hydrocarbon compounds involves pumping water to the surface and stripping out the contaminants in aeration towers, or removing the pollutants on a sorbent. The former process is not permitted in some states, and the latter is expensive and involves the production of concentrated toxic materials that may present future problems.

A number of methanotrophic bacteria have been shown to degrade TCE. Little et al., *Appl. Envt. Microbiol.* 54: 951-956 (1989); Wackett and Gibson, *Appl. Envt. Microbiol.* 54: 1703-1708 (1988). However, to date degradation of TCE by chemo-litho-autotrophic bacteria has not been reported. In view of the environmental problems associated with halogenated hydrocarbons there is a need for a method to degrade halogenated hydrocarbons utilizing ammonia-oxidizing bacterium.

SUMMARY OF THE INVENTION

We have discovered that certain autotrophic ammonia-oxidizing bacterium of the genus Nitrosomonas are capable of degrading halogenated hydrocarbon compounds, such as TCE. Upon culturing these bacteria in an aqueous medium with an amount of ammonia effective to sustain growth, the bacteria are then capable of essentially complete degradation of halogenated hydrocarbon compounds.

Preferably, rates of halogenated hydrocarbon degradation according to the present invention are from about 1 to 100 µmoles/hr./g of wet cells. In a preferred embodiment we have achieved rates of TCE degradation of about 2 to about 30 micromoles per hour per gram wet weight of *Nitrosomonas europaea* cells. The present invention provides for degradation of halogenated hydrocarbons present in initial concentrations of up to about 300-400 micromoles/l and preferably provides for degradation of halogenated hydrocarbon compounds, such as TCE, at initial concentrations from trace amounts up to about 100 micromoles/l. Moreover, the cultured cells are characterized by a membrane bound ammonia monooxygenase (AMO).

Further, in a preferred embodiment, *Nitrosomonas europaea* cells effect degradation of halogenated hydrocarbons in a media when cells are employed in amounts of from about 10 mg to about 2000 mg wet wt. of cells/l. In the case of solid material such as soil, decontamination may be conducted by an extractive process which preferably is operated so as to bring the bacteria of this invention into contact with solutions or slurries having halogenated hydrocarbon concentrations of, e.g. from the lowest detectable concentration (trace amounts) up to about 300-400 µM. These aqueous solutions are obtained by continuously or intermittently leaching the solid material with pH-controlled water comprising the halogenated hydrocarbon degrading bacterium and ammonia. To degrade halogenated hydrocarbon compounds in the aqueous solution from about 10 µmolar to about 40 mmolar ammonia is preferred. Surface and ground water may also be detoxified, by inoculating the water with an effective amount of the present bacterium together with an ammonia source.

It is expected that methods known to the art could be employed to produce mutations of the ammonia-oxidizing bacterium of the present invention which would also possess useful properties with respect to the degradation of halogenated hydrocarbons such as TCE.

The present method is advantageous in that it both rapidly and completely degrades halogenated hydrocarbon compounds such as TCE. Other features and advantages of the invention will be apparent from the following detailed description and appended claims.

DETAILED DESCRIPTION OF THE INVENTION

Halogenated Hydrocarbon—Containing Compounds

Figure 1:
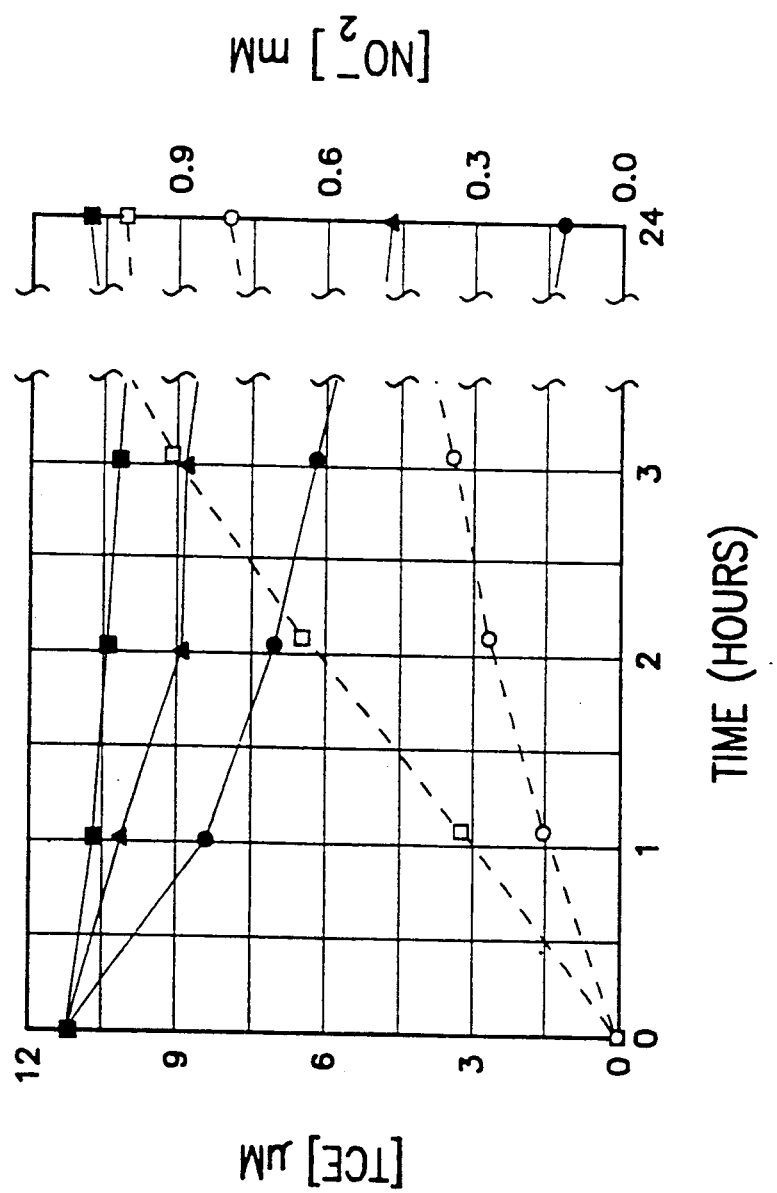
FIG. 1 shows time course of production of nitrite (dashed lines) and disappearance of TCE (solid lines) catalyzed by Nitrosomonas. (■) cells, NH$_3$, TCE, acetylene (Δ) cells, TCS. (●) cells, NH$_3$, TCE. (□) cells, NH$_3$. (●) cells, NH$_3$, TCE.

The present invention provides a method of rapidly and completely degrading a halogenated hydrocarbon compound. Although the present invention preferably provides a method of degrading trichloroethylene (TCE), other halogenated hydrocarbons which may be degraded by the present method include, but are not limited to, tetrachloroethane, tetrachloroethylene (PCE), trichloroethane, dichloroethane (DCA), and chloroform.

The preferred halogenated hydrocarbon compound of the present invention, TCE (1,1,2-trichloroethene), is an aliphatic halogenated hydrocarbon with the chemical structure $HClC=CCl_2$. TCE is primarily used in industry as a fire-resisting solvent. It can be produced by removal of one molecule of hydrogen chloride from acetylene tetrachloride with alkali.

Nitrosomonas Bacteria

The present invention utilizes ammonia-oxidizing bacteria to degrade the halogenated hydrocarbon-containing compounds described above. Preferably, bacteria of the strain *Nitrosomonas europaea* are utilized which produce the enzyme ammonia monoxygenase (AMO). Other ammonia-oxidizing bacteria which produce AMO may be useful in the present invention. These other bacteria include, but are not limited to, Nitrosomonas, e.g., Nitrosospira species, Nitrosolubus species, Nitrosococcus species, Nitrosovibrio species and Nitrosocystis species and other chemo-lithiotrophic ammonia oxidixing bacteria.

*Nitromonas europaea* is an ubiquitous soil and water-dwelling ammonia oxidizing nitrifying bacteria which is an obligate aerobic autotroph which depends on the oxidation of ammonia to nitrite for growth. Characteristics of *Nitrosomonas europaea* have been previously described. Hyman et al., *Applied and Environmental Microbiol.* 54, 3187-3190 (1988); Wood, *In Nitrification*, p. 39 (J. J. Prosser Ed. 1986). *Nitrosomonas europaea* has been deposited with the American Type Culture Collection (ATCC 1978).

Degradation of Halogenated Hydrocarbon Compounds

The present invention provides a method of microbial degradation of a halogenated hydrocarbon compound. The method comprises contacting a media containing the halogenated hydrocarbon compound, preferably TCE, with an amount of an autotrophic ammonia-oxidizing bacterium, preferably *Nitrosomonas europaea*, effective to completely degrade the halogenated hydrocarbon compound. As used herein the halogenated hydrocarbon containing media can be an aqueous solution or dispersion, a slurry containing contaminated soil or halogenated hydrocarbon contaminated soil alone. In the method of the present invention the ammonia oxidizing bacterium is grown and harvested as described in Hooper and Nason, *J. Biol. Chem.*, 240: 4044-4057 (1965), Hooper in *Autotrophic Bacteria*, Schlagel and Bowein, eds. (1989) at pages 239-265, incorporated by reference herein. As used herein, an effective amount of autotrophic ammonia oxidizing bacterium is an amount of the bacterium capable of degrading TCE to insignificant levels; preferably, at the rates stated herein. While *Nitrosomonas europaea* can be used to degrade TCE with little if any ammonia present, sustained growth of the bacteria for long-term use in the present invention is best accomplished when the organism is grown in an aqueous media containing at least 10 $\mu$mol/l ammonia and preferably from about 1 mmol/l to about 10mmol/l ammonia.

In one embodiment of the present invention the halogenated hydrocarbon containing media to be degraded by the present method is contacted with the ammonia-oxidizing bacterium in an aqueous media which comprises about 1 mg to about 2 g wet wt/l of the ammonia-oxidizing bacterium. The preferred aqueous media used in the present invention is the nutrient medium described in Hooper & Nason, *J. Biol Chem., supra*. Other aqueous media suitable for use in the present invention can readily be identified by those of skill in the art.

The present method provides for degradation of essentially all of a halogenated hydrocarbon compound, preferably TCE, present at initial concentrations up to 300-400 micromoles/l and more preferably at concentrations of from trace amounts to about 100 micromoles/l to undetectable amounts. These concentration values represent the initial concentration of the halogenated hydrocarbon compound in a solution comprising the hydrocarbon compound, the bacterium, ammonia, and the aqueous media. It is to be understood that trace amounts refers to lower limits of detection by assay techniques described in the Example herein.

The invention will be further described with reference to the following detailed example.

Treatment of Contaminated Soil

Solids

The TCE degrading capability of the present bacterium can be used to particular advantage in the treatment of TCE contaminated solid material by the process comprising contacting the TCE present in or on the solid material with water so as to extract the TCE, which is then degraded with an effective amount of the present bacterium. Preferably the solid material will be slurried or leached with water (the leachate) in order to remove the TCE therefrom. To increase the amounts of solid that can be detoxified with a given volume of leachate, the leachate preferably is intermittently or continuously recycled through the solid, thus greatly increasing the TCE levels in the collected leachate to be detoxified, and maximizing the detoxification efficiency of the bacteria.

Specifically, TCE contaminated solids such as soil, or landfill can be detoxified by collecting the solids in a holding area, such as a pit, and leaching the TCE from the contaminated material by passing pH-adjusted ammonia-containing water through the solids and separating the leachate from the solids, preferably via a porous solid layer positioned under the material. In the case of intermittent leaching, the water will then be passed into a collection area such as a tank, pool or the like, where it is held until reintroduced into the pit area.

It is also envisioned that the method to degrade halogenated hydrocarbons described can be applied directly to soil containing halogenated hydrocarbon contaminates, such as TCE together with ubiquitous Nitrosomonas present in the soil. In this case naturally present Nitrosomonas can be stimulated to degrade the halogenated hydrocarbon compounds by adding an effective amount of ammonia to the halogenated hydrocarbon contaminated soil.

The invention will be further described with reference to the following detailed example.

EXAMPLE—TCE DEGRADATION

Materials and Methods

Sources; TCE, Spectrophotometric grade, Aldrich Chem. Co., Milwaukee, Wis., $\alpha\alpha'$dipyridyl and calcium carbide, Fisher Chem, Fairlawn N.J.; tetrapyrin (2-chloro-6-trichloromethylpyridine), Dow Chem. Co., Midland, Mich. Saturated acetylene solutions were prepared by passing acetylene, generated from aqueous calcium carbide in one serum bottle, through buffer in a second serum bottle. *Nitrosomonas europaea* was grown and harvested as described in Hooper and Nason, *J. Biol. Chem., supra*. Cells were stored at 4° C. as a 20% (wet weight) suspension. Oxygen utilization was assayed in a Gilson Medical Electronics, Middleton, Wis. oxygraph with a Clark electrode. The chamber contained 1.5 mg ml$^{-1}$ wet weight cells and 1 mM ammonia.

Procedure

For degradation of TCE, a 50 ml volume of reaction mixture containing, as indicated, 0.8 mg wet weight (0.11 mg protein) ml$^{-1}$ of cells, 0.5 mM ammonium sulfate, and TCE in 50 mM Na/K phosphate solution, pH 7.5, was incubated at 20° C. in an inverted 125 ml Wheaton (Millville, N.J. sorum bottle sealed with Pierce (Rockford, Ill.) "tufbond" teflon rubber laminated disc and hypo-vial aluminum clasp. A 5 μl volume of 110 mM TCE in dimethylsulfoxide (DMSO) was added to start the reaction. The concentration of TCE 11 μM is expressed as if it were all dissolved in 50 ml, see Wackett and Gibson, *Appl. Envt. Microbio*, 54: 1703-1708 (1988). A sample of the head-space gas was removed with a Hamilton (Reno, Nev.) 250 μl gas-tight syringe with 22S gauge blunt-tip (#3 point) needle and injected into a Hewlett-Packard 5890 Gas Chromotograph (HP#3396A integrator). Chromatography was isothermal at 55° C. using He carrier gas (1.5 ml min$^{-1}$) on a 30 m, 0.25 mm ID DB-5 fused silica capillary column (J&W Scientific, Folsom, Calif.). Analysis was by electron capture detector at 250° C. with Ar:CH$_4$ (95:5) make up gas at 60 ml min$^{-1}$. Under these conditions of injection and assay and a split ratio of 1:40, 50 μl of 11 μM TCE had an Rf of 2.5 and gave an integrated peak size of 160,000 area units. Three injections of single samples from the incubation vessel usually gave errors of ±1% and no greater than 3%. Nitrite was assayed as described in Hooper and Nasen, *J. Biol. Chem. supra.*,

Results

The rate of utilization of oxygen by cell suspensions with 1 mM ammonia was inhibited by 98% in the presence of 1.1 mM TCE. When cells were incubated under these conditions for 15 min, washed by sedimentation and resuspended, complete ammonia-oxidizing activity was recovered. In contrast, the rate of oxygen utilization coupled to the oxidation of 2 mM hydroxylamine was not inhibited by 1.1 mM TCE. The results suggest that TCE may interact specifically with AMO and that, at least in short term incubations, cells are not inactivated. The inhibitory effect of TCE on production of nitrate from ammonia is shown in FIG. 1 and Table I. Incubation of Nitrsomonas with 11 μM TCE resulted in the progressive disappearance of TCE and very slow production of nitrite (FIG. 1 and Table I). At the end of 24 hrs the ratio of TCE degraded:nitrite produced was approximately 1:10. In the absence of cells (in the presence or absence of NH$_3$), TCE disappearance was less than 1 μM in 24 hrs (Table I). With fresh cells the rate of TCE degradation was often not stimulated by the addition of ammonia. With storage of the cells for several days the rate of TCE degradation in the absence of added ammonia decreased to as little as zero. With aged cells, the addition of ammonia stimulated the rate of TCE degradation.

The disappearance of 11 μM TCE as catalyzed by a suspension of aged Nitrosomonas in the presence of 1 mM ammonia occurred at an initial rate of at least 1.1 nmoles (mg protein)$^{-1}$ min$^{-1}$ and continued at nearly that rate for many hours. Nearly all TCE had disappeared from the headspace by the end of the reaction. The amount of nitrite produced indicated that the added and endogenous ammonia had been completely utilized. At 3 hrs or 24 hrs the ratio of TCE degraded:nitrite produced was approximately 1:100 (Table I). A second and third addition of the same concentrations of TCE and ammonia and subsequent incubation of 24 hrs resulted in the further disappearance of 5 and 4 μM TCE and additional appearance of 430 and 63 μM nitrite, respectively. The rate of degradation of TCE and production of nitrite progressively decreased during these long incubations. In cells lacking TCE, the loss of nitrite-producing ability occurred with approximately the same time course.

Table I shows that the ammonia-dependent disappearance of TCE was inhibited by $\alpha\alpha'$dipyridyl, nitrapyrin or acetylene at concentrations where oxidation of ammonia but not hydroxylamine is inhibited.

The above example demonstrates the disappearance of TCE from the headspace of bottles containing Nitrosomonas. Controls show that the disappearance is not due to leakage from the bottles or adsorption to glass. The complete loss of activity in aged cells lacking ammonia and the sensitivity to specific inhibitors of oxidation of ammonia indicates that TCE is being chemically transformed rather than just absorbed by cells. Two observations indicate that degradation of TCE is catalyzed by or strongly dependent on turnover of AMO: (a) stimulation by ammonia of degradation of TCE (b) inhibition of TCE degradation by compounds which are thought to specifically inhibit oxidation of ammonia.

TCE degradation continues for several days at the concentrations of Nitrosomonas, TCE and NH$_3$ used in the present study. The observed loss of TCE-degrading activity seemed to be unrelated to the presence of TCE. Thus we have not observed reversible inactivation, by TCE or its degradation product, of the TCE-degrading capability of Nitrosomonas as has been observed with organisms catalyzing the methane-or toluene-dependent degradation of TCE. Table I. Transformation of TCE by Suspensions of Nitrosomonas europaea[1].

What is claimed is:

1. A method for microbial degradation of a halogenated hydrocarbon compound comprising:
   contacting an aqueous solution containing a concentration of ammonia effective to sustain growth and said halogenated hydrocarbon with an amount of an autotrophic ammonia-oxidizing bacterium effective to degrade essentially all of said halogenated hydrocarbon compound.

2. The method of claim 1 wherein said halogenated hydrocarbon containing solution is contacted with an aqueous media comprising from about 10 mg to about 2 g/of wet weight of cells/l of said ammonia-oxidizing bacterium.

3. The method of claim 1 wherein said ammonia-oxidizing bacterium is capable of degrading said halogenated hydrocarbon compound at initial concentrations of up to about 300–400 micromoles/l.

4. The method of claim 1 wherein said ammonia-oxidizing bacterium is Nitrosomonas europaea.

5. The method of claim 1 wherein said ammonia-oxidizing bacterium is a species selected from the group consisting of Nitrosospira, Nitrosolabus, Nitrosovibrio and Nitrosocytis.

6. The method of claim 1 wherein said halogenated hydrocarbon compound is an aliphatic halogenated hydrocarbon compound.

7. The method of claim 1 wherein said aliphatic halogenated hydrocarbon compound is trichloroethylene (TCE).

8. A method for microbial degradation of a halogenated hydrocarbon compound, said method comprising:

contacting an aqueous solution containing a concentration of ammonia effective to sustain growth and said halogenated hydrocarbon compound with an amount of a ammonia-oxidizing bacterium effective to degrade substantially all of said halogenated hydrocarbon compound at a rate of from about 1 to about 100 micromoles per hour per gram wet cells, said ammonia-oxidizing bacterium producing an ammonia monoxygenase.

9. The method of claim 8 wherein said ammonia-oxidizing bacterium is capable of degrading said halogenated hydrocarbon compound at a rate of from about 2 to about 30 μmoles per hour per gram wet cells.

10. The method of claim 8 wherein said halogenated hydrocarbon containing solution is contacted with an aqueous media comprising about 10 mg to about 2000 mg wet weight of said ammonia-oxidizing bacterium per liter.

11. The method of claim 8 wherein said ammonia-oxidizing bacterium is capable of degrading said halogenated hydrocarbon compound at concentrations of at least about 300–400 micromoles/l.

12. The method of claim 8 wherein said ammonia-oxidizing bacterium is *Nitrosomonas europaea*.

13. The method of claim 8 wherein said halogenated hydrocarbon compound is an aliphatic halogenated hydrocarbon compound.

14. The method of claim 8 wherein said aliphatic halogenated hydrocarbon compound is trichloroethylene (TCE).

15. A method of degrading a halogenated hydrocarbon compound comprising culturing an ammonia-oxidizing bacterium of the genus Nitrosomonas in an aqueous medium comprising an amount of ammonia effective to sustain growth; and then contacting a halogenated hydrocarbon compound containing media with an amount of said bacterium effective to degrade substantially all of said halogenated hydrocarbon.

16. The method of claim 15 wherein said amount of ammonia is from trace amounts to about 40 mM.

17. The method of claim 15 wherein said bacteria is capable of degrading said halogenated hydrocarbon compound at a rate of about 1–100 micromoles per hour per gram wet cells.

18. The method of claim 15 wherein said bacterium is capable of degrading TCE at initial concentrations of about 100 μmoles/l.

19. The method of claim 15 wherein from about 10–2000 mg wet weight of said bacterium per liter are added to said media.

20. The method of claim 16 wherein said media is an aqueous solution containing TCE.

21. The method of claim 15 wherein said media is an aqueous slurry containing TCE.

22. The method of claim 15 wherein said media is soil contaminated with TCE.

23. The method of claim 15 wherein said bacterium is *Nitrosomonas europaea*.

* * * * *

UNITED STATES PATENT AND TRADEMARK OFFICE
CERTIFICATE OF CORRECTION

PATENT NO. : 5,055,193
DATED : October 8, 1991
INVENTOR(S) : Alan Hooper

It is certified that error appears in the above-identified patent and that said Letters Patent is hereby corrected as shown below:

At column 1, lines 19-20, for "trichlo-rethylene" read --trichloroethylene--

At column 2, line 61, for "TCS" read --TCE

At column 5, line 26, for "N.J. sorum" read --N.J.) serum--

At column 5, line 27, after "teflon" insert --/--

At column 5, line 32, for "Microbio," read --Microbiol.,--

UNITED STATES PATENT AND TRADEMARK OFFICE
CERTIFICATE OF CORRECTION

PATENT NO. : 5,055,193
DATED : October 8, 1991
INVENTOR(S) : Alan Hooper

It is certified that error appears in the above-indentified patent and that said Letters Patent is hereby corrected as shown below:

At column 6, line 54, after "europaea[1]." insert the following table:

| Incubation Mixture | Rate[2] | | Net Change[3] | |
|---|---|---|---|---|
| | ΔTCE | +ΔNO$_2$ | ΔTCE | +ΔNO$_2$ |
| | (nmoles min$^{-1}$ mg prot.$^{-1}$) | | ($\mu$M) | |
| TCE | -0.015 | -- | 1.0 | -- |
| cells,TCE | 0.2 | -- | 7.6 | 65 |
| cells,NH$_3$ | -- | 73 | -- | 1400 |
| cells, TCE,NH$_3$ | 0.42 | 42 | 11 | 1300 |
| cells,NH$_3$, dipyridyl[4] | -- | 14 | -- | 1100 |
| cells,NH$_3$,dipyridyl,TCE | 0.081 | 0.7 | 1.2 | 0 |
| cells,NH$_3$,nitrapyrin[5] | -- | 4.1 | -- | 160 |
| cells,NH$_3$,nitrapyrin,TCE | 0.024 | 0.1 | 1.6 | 27 |
| cells,NH$_3$,acetylene[6] | -- | -1.4 | -- | 0 |
| cells,NH$_3$,acetylene,TCE | 0.082 | 0.5 | 0.38 | 0 |
| cells,acetylene,TCE | -0.041 | 0 | 0.37 | 0 |

UNITED STATES PATENT AND TRADEMARK OFFICE
CERTIFICATE OF CORRECTION

PATENT NO. : 5,055,193
DATED : October 8, 1991
INVENTOR(S) : Alan Hooper

It is certified that error appears in the above-indentified patent and that said Letters Patent is hereby corrected as shown below:

> [1]Assay conditions described in Materials and Methods. [2]At 3 hrs. [3]At 24 hours. [4]0.1 mM aa'dipyridyl (stock 50 mM in DMSO). See Wackett & Gibson, supra 0.05 mM nitrapyrin (stock 25 mM in DMSO). [5]Cells (5% w/w suspension) were preincubated for 30 min with stirring in the presence of 150 uM acetylene (added from a 77 mM stock solution) in a sealed bottle with no head space.

Signed and Sealed this

Eleventh Day of January, 1994

Attest:

BRUCE LEHMAN

Attesting Officer     Commissioner of Patents and Trademarks